US012568436B2

(12) United States Patent
Lee

(10) Patent No.: US 12,568,436 B2
(45) Date of Patent: Mar. 3, 2026

(54) COMMUNICATION DEVICE SUPPORTING DISCONTINUOUS RECEPTION OPERATION AND OPERATING METHOD THEREOF

(71) Applicant: Samsung Electronics Co., Ltd., Suwon-si (KR)

(72) Inventor: Doohee Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 764 days.

(21) Appl. No.: 17/836,663

(22) Filed: Jun. 9, 2022

(65) Prior Publication Data

US 2022/0400438 A1 Dec. 15, 2022

(30) Foreign Application Priority Data

Jun. 10, 2021 (KR) ........................ 10-2021-0075743
Aug. 10, 2021 (KR) ........................ 10-2021-0105485

(51) Int. Cl.
*H04W 52/02* (2009.01)
*H04W 24/10* (2009.01)
*H04W 68/00* (2009.01)

(52) U.S. Cl.
CPC ....... *H04W 52/0232* (2013.01); *H04W 24/10* (2013.01); *H04W 52/0235* (2013.01); *H04W 68/005* (2013.01)

(58) Field of Classification Search
CPC ............. H04W 52/0232; H04W 24/10; H04W 52/0235
See application file for complete search history.

(56) References Cited

U.S. PATENT DOCUMENTS 7,596,378 B1 * 9/2009 Nizri ..................... H04W 60/04
455/448
9,119,153 B2 8/2015 Deivasigamani et al.
9,788,272 B2 10/2017 Kim et al.
(Continued)

FOREIGN PATENT DOCUMENTS

CN 112534882 A 3/2021
EP 3800933 A1 4/2021
(Continued)

OTHER PUBLICATIONS

Extended European Search Report dated Oct. 27, 2022 for corresponding EP Patent Application No. 22177805.3.

*Primary Examiner* — Yemane Mesfin
(74) *Attorney, Agent, or Firm* — Harness, Dickey & Pierce, P.L.C.

(57) ABSTRACT

A method of operating a communication device supporting a discontinuous reception (DRX) operation includes determining a movement state of the communication device based on a first electric field value change amount in an inter-frequency band to obtain a determined movement state, the inter-frequency band being different from an intra-frequency band allocated for communication with a serving cell, determining at least one of a measurement target frequency band or a measurement target cell according to the determined movement state, measuring an electric field value corresponding to the at least one of the measurement target frequency band or the measurement target cell, and updating the movement state based on the electric field value to obtain an updated movement state.

14 Claims, 12 Drawing Sheets

(56) References Cited

U.S. PATENT DOCUMENTS

| | | | | |
|---|---|---|---|---|
| 10,952,055 | B2 | 3/2021 | Jeon et al. | |
| 2010/0081420 | A1* | 4/2010 | Ootsuka | G01S 11/06 |
| | | | | 455/418 |
| 2014/0169246 | A1 | 6/2014 | Chui et al. | |
| 2014/0248865 | A1 | 9/2014 | Williams | |
| 2016/0119876 | A1* | 4/2016 | Gopal | H04W 24/02 |
| | | | | 370/252 |
| 2019/0335396 | A1 | 10/2019 | Yang et al. | |
| 2019/0335530 | A1 | 10/2019 | Yang et al. | |
| 2020/0100184 | A1 | 3/2020 | Zhang | |
| 2020/0275289 | A1 | 8/2020 | Thangarasa et al. | |
| 2020/0344840 | A1 | 10/2020 | Shi et al. | |
| 2020/0413367 | A1 | 12/2020 | Chen | |
| 2021/0028844 | A1 | 1/2021 | Song et al. | |
| 2021/0176814 | A1 | 6/2021 | Shi | |

FOREIGN PATENT DOCUMENTS

| | | | |
|---|---|---|---|
| KR | 101684196 | B1 | 12/2016 |
| KR | 101759135 | B1 | 7/2017 |
| KR | 101777538 | B1 | 9/2017 |
| KR | 101784124 | B1 | 10/2017 |
| KR | 10-2019-0004546 | A | 1/2019 |
| KR | 102111266 | B1 | 5/2020 |
| KR | 10-2021-0045406 | A | 4/2021 |

* cited by examiner

COMMUNICATION DEVICE SUPPORTING DISCONTINUOUS RECEPTION OPERATION AND OPERATING METHOD THEREOF

CROSS-REFERENCE TO RELATED APPLICATIONS

This application is based on and claims priority under 35 U.S.C. § 119 to Korean Patent Applications No. 10-2021-0075743, filed on Jun. 10, 2021 and No. 10-2021-0105485, filed on Aug. 10, 2021, in the Korean Intellectual Property Office, the disclosures of which are incorporated by reference herein in their entireties.

BACKGROUND

The inventive concepts relate to a communication device, and more particularly, to a communication device for performing a discontinuous reception operation and an operating method thereof.

A wireless communication device may measure an electric field value for serving cell selection according to a discontinuous reception (DRX) operation cycle. In order to reduce power consumption, when the electric field value measurement is completed, the wireless communication device may cut off power supply to an unused module and enter a sleep state.

SUMMARY

Embodiments of the inventive concepts provide a device and a method of maintaining a longer sleep state during a DRX operation cycle in order to reduce power consumption of the wireless communication device.

The inventive concepts provide a communication device that supports an efficient discontinuous reception operation by reducing power consumption.

According to an aspect of the inventive concepts, there is provided a method of operating a communication device supporting a discontinuous reception (DRX) operation including determining a movement state of the communication device based on a first electric field value change amount in an inter-frequency band to obtain a determined movement state, the inter-frequency band being different from an intra-frequency band allocated for communication with a serving cell, determining at least one of a measurement target frequency band or a measurement target cell according to the determined movement state, measuring an electric field value corresponding to the at least one of the measurement target frequency band or the measurement target cell, and updating the movement state based on the electric field value to obtain an updated movement state.

According to an aspect of the inventive concepts, there is provided a communication device including processing circuitry configured to determine a movement state of the communication device based on a first electric field value change amount in an inter-frequency band to obtain a determined movement state, the inter-frequency band being different from an intra-frequency band allocated for communication with a serving cell, determine at least one of a measurement target frequency band or a measurement target cell according to the determined movement state, measure an electric field value corresponding to the at least one of the measurement target frequency band or the measurement target cell, and update the movement state based on the electric field value to obtain an updated movement state.

According to an aspect of the inventive concepts, there is provided a method of operating a communication device supporting a DRX operation including adjusting at least one of a measurement target frequency band or a measurement target cell based on an electric field value change amount in an inter-frequency band being less than a threshold for more than a first time period, the inter-frequency band being different from an intra-frequency band allocated for communication with a serving cell with a threshold, and measuring an electric field value corresponding to the at least one of the measurement target frequency band or the measurement target cell.

BRIEF DESCRIPTION OF THE DRAWINGS

Embodiments of the inventive concepts will be more clearly understood from the following detailed description taken in conjunction with the accompanying drawings in which.

DETAILED DESCRIPTION

Hereinafter, embodiments of the inventive concepts will be described in detail with reference to the accompanying drawings.

Figure 1:
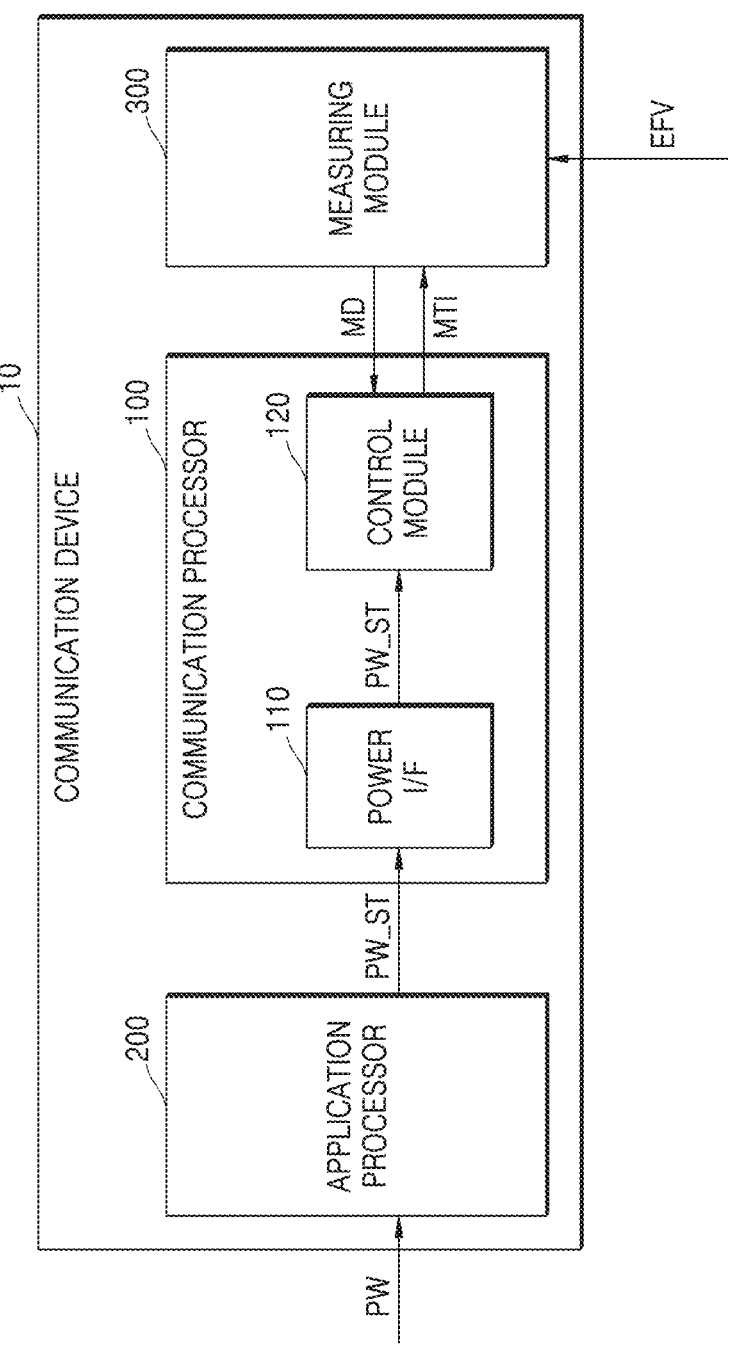
FIG. 1 is a block diagram of a configuration of a communication device according to embodiments.

FIG. 1 is a block diagram of a configuration of a communication device 10 according to embodiments.

The communication device 10 (may also be referred to herein as a wireless communication device) illustrated in FIG. 1 may be included in a wireless communication system using a cellular network such as 5G, long term evolution (LTE), LTE-Advanced, and the like, or may be included in a Wireless Local Area Network (WLAN) system or any other wireless communication system. For reference, because the configuration of the wireless communication device 10 shown in FIG. 1 is only an example, the inventive concepts are not limited thereto, and the wireless communication device 10 may be variously configured according to a communication protocol or a communication method.

Referring to FIG. 1, the communication device 10 may include a communication processor 100, an application processor 200, and/or a measurement module 300. The communication processor 100 and the application processor 200 may be divided into separate hardware components, but the communication processor 100, the application processor 200, and the measurement module 300 are not limited thereto, and may be configured to perform different functions in a single hardware.

According to embodiments, the communication processor 100 may process a baseband signal including information to be transmitted according to a certain communication method and process a received baseband signal according to the certain communication method. For example, the communication processor 100 may process a signal to be transmitted or a received signal according to a communication method such as Orthogonal Frequency Division Multiplexing (OFDM), Orthogonal Frequency Division Multiple Access (OFDMA), Wideband Code Multiple Access (WCDMA), or High Speed Packet Access+ (HSPA+). In addition, the communication processor 100 may process baseband signals according to various types of communication methods (e.g., various communication methods in which a technique for modulating or demodulating the amplitude and/or frequency of a baseband signal is applied).

The communication processor 100 may include a power interface (I/F) 110 and/or a control module 120. The power interface 110 may output (e.g., transmit) information about whether the power of an external device is turned on or off from the application processor 200 to the control module 120. The control module 120 may determine a movement state of the communication device 10 based on a power state PW_ST of the external device received from the power interface 110 and measurement data MD received from the measurement module 300. The configuration and operation method of the control module 120 is described below in detail with reference to FIG. 2.

According to embodiments, the application processor 200 may determine whether power PW of the external device is turned off. For example, the external device is a device for transmitting and/or receiving information through the communication device 10, and the application processor 200 may determine that the power PW of the external device is turned off when there is no information transmitted from the external device and/or no information request (e.g., no information request is received from the external device). In this case, the external device may be a vehicle (e.g., an automobile) as a device for transmitting and/or receiving information to and from a plurality of devices connected to a network through a wireless network, but the external device is not limited thereto.

The measurement module 300 may measure an electric field value EF (the electric field value may also be denoted EFV herein) of a signal received by the communication device 10, and the electric field value EF of the received signal may be referred to as electric field strength or signal strength. According to embodiments, the measurement module 300 may measure the electric field value EF of a signal received from a plurality of cells, and may store the electric field value EF of the received signal for each of the plurality of cells and/or a plurality of frequency bands.

The measurement module 300 may receive measurement target information MTI from the communication processor 100, and may provide measurement data MD including the electric field value EF corresponding to the measurement target information MTI as the measurement data MD to the communication processor 100. The measurement target information MTI may include information about a measurement target cell and/or a measurement target frequency band determined according to the movement state of the communication device 10.

The communication processor 100, the application processor 200, and/or the measurement module 300 may be individually implemented as ICs, chips, or modules, respectively. In addition or alternatively, the communication processor 100, the application processor 200, and the measurement module 300 may be mounted together on a printed circuit board PCB. However, the inventive concepts are not limited thereto, and in embodiments, at least two of the communication processor 100, the application processor 200, and the measurement module 300 may be implemented as a single chip.

Figure 2:
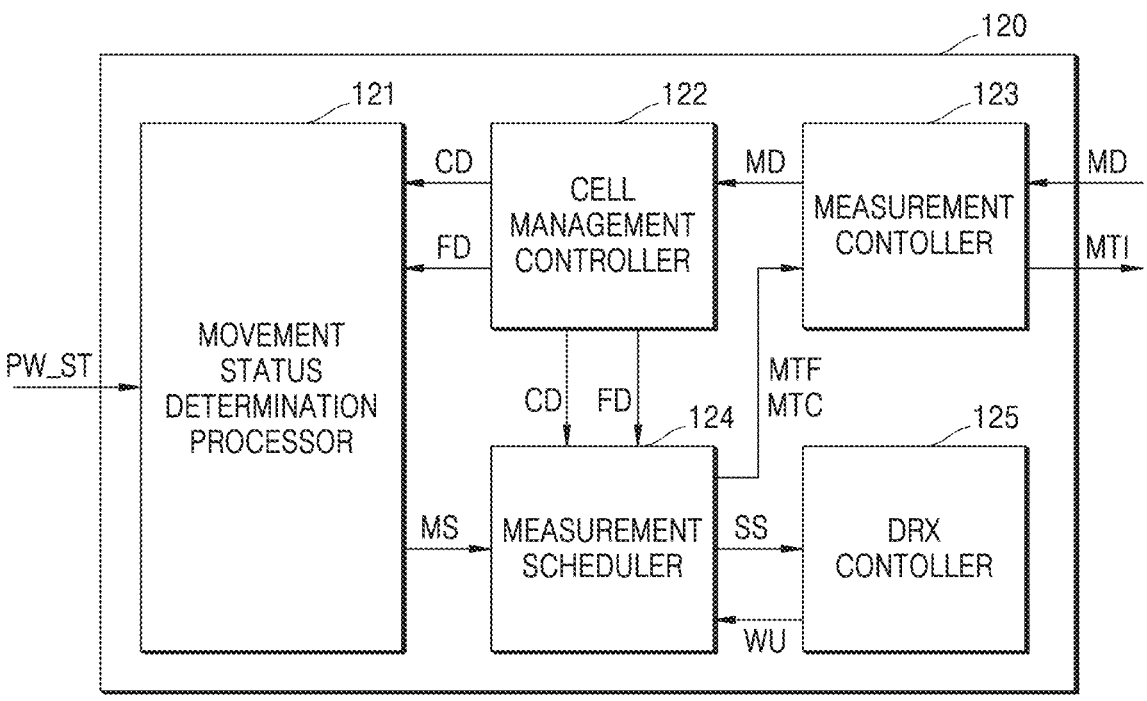
FIG. 2 is a block diagram of a configuration of a control module according to embodiments.

FIG. 2 is a block diagram schematically illustrating a configuration of the control module 120 according to embodiments.

Referring to FIG. 2, the control module 120 may include a movement state determination processor 121, a cell management controller 122, a measurement controller 123, a measurement scheduler 124, and/or a DRX controller 125. The control module 120 may determine the measurement target information MTI according to the measurement data MD generated based on the electric field value EF measured by the measurement module 300 and the power state PW_ST of the external device. The control module 120 may request the electric field value EF corresponding to a measurement target cell MTC and/or a measurement target frequency band MTF by providing the measurement target information MTI to the measurement module 300.

The movement state determination processor 121 may receive at least one of a target cell electric field value CD and/or a target frequency band value FD, and may determine a movement state MS based on the received electric field value EF (e.g., the target cell electric field value CD and/or the target frequency band value FD). The movement state determination processor 121 may determine the movement state MS of the communication device 10 by receiving the power state PW_ST of the external device. For example, the movement state determination processor 121 may determine that the movement state MS thereof (e.g., of the external device) is a stationary state when the amount of change of the received electric field value EF for a certain time is less than a threshold, and may determine that the movement state MS thereof (e.g., of the external device) is a stationary state even when the power state PW_ST is off.

The cell management controller 122 may provide at least one of the target cell electric field value CD and/or the target frequency band value FD to the movement state determination processor 121 and the measurement scheduler 124. In this case, the target cell electric field value CD and the target frequency band value FD may be electric field values stored for each discontinuous reception cycle for a certain time.

According to embodiments, when the movement state MS thereof (e.g., of the external device) is a stationary state, the cell management controller 122 may provide any one of the target cell electric field value CD and/or the target frequency band value FD to the movement state determination processor 121 and the measurement scheduler 124 according to a discontinuous reception operation mode. In order for the movement state determination processor 121 to calculate the change amount of the electric field value EF for a certain time, the cell management controller 122 may provide electric field values EF stored for a certain time to the movement state determination processor 121.

For example, when a discontinuous reception operation is performed in an idle mode, the cell management controller 122 may provide the electric field value EF for a serving cell as the target cell electric field value CD to the movement state determination processor 121 and the measurement scheduler 124. When the discontinuous reception operation is performed in a connected mode, the cell management controller 122 may provide the electric field value EF for an intra-frequency band as the target frequency band value FD to the movement state determination processor 121 and the measurement scheduler 124. In this case, the intra-frequency band may correspond to a frequency band allocated to the serving cell.

The measurement controller 123 may generate the measurement target information MTI by receiving at least one of the measurement target frequency band MTF and/or the measurement target cell MTC from the measurement scheduler 124, and may provide the measurement target information MTI to the measurement module 300. The measurement controller 123 may receive the measurement data MD corresponding to the measurement target information MTI from the measurement module 300 indicating (e.g., including) a measurement of the electric field value EF, and may provide the measurement data MD to the cell management controller 122. The cell management controller 122 may manage the measurement data MD in correspondence with the measurement target frequency band MTF and/or the measurement target cell MTC.

The measurement scheduler 124 may receive the movement state MS determined by the movement state determination processor 121, and may schedule operations of the measurement controller 123 and the DRX controller 125 for each movement state MS. The measurement scheduler 124 may determine the measurement target frequency band MTF and/or the measurement target cell MTC for each movement state MS, provide the measurement target frequency band MTF and/or the measurement target cell MTC to the measurement controller 123, and provide a sleep mode entry time point SS to the DRX controller 125.

The sleep mode entry time point SS may be determined differently according to the discontinuous reception operation mode. For example, when the discontinuous reception operation mode is an idle mode, the sleep mode entry time point SS may be determined to enter a sleep mode so that the sleep mode may be entered after the measurement of an electric field value for a serving cell and the reception of paging are completed. When the discontinuous reception operation mode is a connected mode, the sleep mode entry time point SS may be determined to enter the sleep mode so that the sleep mode is entered after the measurement of an electric field value for an intra-frequency band is completed.

The DRX controller 125 may inform the measurement scheduler 124 of information about (e.g., the DRX controller 125 may provide an indication to the measurement scheduler 124 as to) whether the discontinuous reception operation mode has been woken up (WU) according to a certain schedule, and may determine a period in which the discontinuous reception operation is deactivated according to the sleep mode entry time point SS received from the measurement scheduler 124.

Each of the movement state determination processor 121, the cell management controller 122, the measurement controller 123, the measurement scheduler 124, and/or the DRX controller 125 may be implemented as an IC and a separate hardware configuration. However, the inventive concepts are not limited thereto, and in embodiments, at least two of the movement state determination processor 121, the cell management controller 122, the measurement controller 123, the measurement scheduler 124, and/or the DRX controller 125 may be implemented as a single communication chip.

Figure 3:
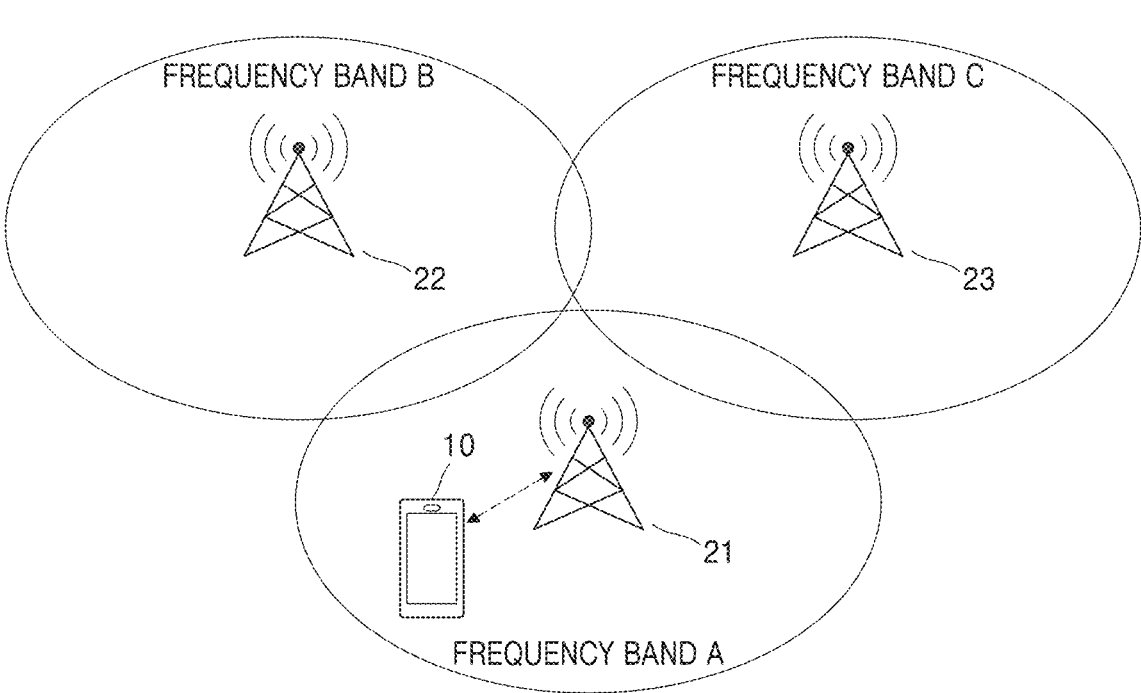
FIG. 3 is a diagram illustrating a communication network according to embodiments.

FIG. 3 is a diagram illustrating a communication network according to embodiments.

Referring to FIG. 3, the communication device 10 may perform wireless communication through a base station of any one of a plurality of cells. For example, the communication device 10 may perform communication with a first base station 21 in frequency band A. At this time, a cell including the first base station 21 may be referred to as a serving cell, and the frequency band A allocated for communication with the communication device 10 in the serving cell may be referred to as an intra-frequency band.

Cells adjacent to the serving cell may be referred to as neighbor cells, and a second base station 22 and a third base station 23 may be base stations included in the neighbor cells. The second base station 22 may be allocated to frequency band B that is different from frequency band A, and the third base station 23 may be allocated to frequency band C that is different from frequency band A. In this case, frequency band B and frequency band C, which are a frequency band that is different from the intra-frequency band, may be referred to as an inter-frequency band.

A cell that a user reselects while moving may be a cell using an intra-frequency band that is the same frequency band as (or a similar frequency band to) that of a serving cell, using the inter-frequency band, or using another radio access technology (RAT) (e.g. inter-RAT).

According to embodiments, a network configuration related to electric field value measurement and search for cell reselection may include S-Measure, S-IntraSearch, and S-nonIntraSearch. S-Measure may be a PCell quality threshold for controlling whether the communication device 10 is to perform measurement of intra-frequency, inter-frequency, and inter-RAT neighbor cells. S-IntraSearch may be a threshold for the communication device 10 to measure the electric field value EF of the intra-frequency band, and when the measured electric field value EF is greater than S-intraSearch, measurement of the intra-frequency band may be omitted. S-nonIntraSearch may be a threshold for the communication device 10 to measure the electric field value EF of the inter-frequency band.

According to a comparative example, search and measurement for intra-frequency, search and measurement for inter-frequency, and search and measurement for inter-RAT may be periodically performed in a discontinuous reception cycle, and in the discontinuous reception cycle in which all search and measurement operations are performed, a communication device may be awake for a longer time.

On the other hand, the communication device 10 may set at least one of the measurement target cell MTC and/or the measurement target frequency band MTF to be searched for and measured differently for each movement state, and may be awake only for a shorter time period during the discontinuous reception operation by measuring only an electric field value for the serving cell in the stationary state with lower mobility. That is, the communication device 10 may efficiently measure an electric field value according to a movement state, thereby reducing power consumption. Hereinafter, a method for the communication device 10 to determine a movement state and determine the measurement target cell MTC or the measurement target frequency band MTF for each movement state are described in detail.

Figure 4:
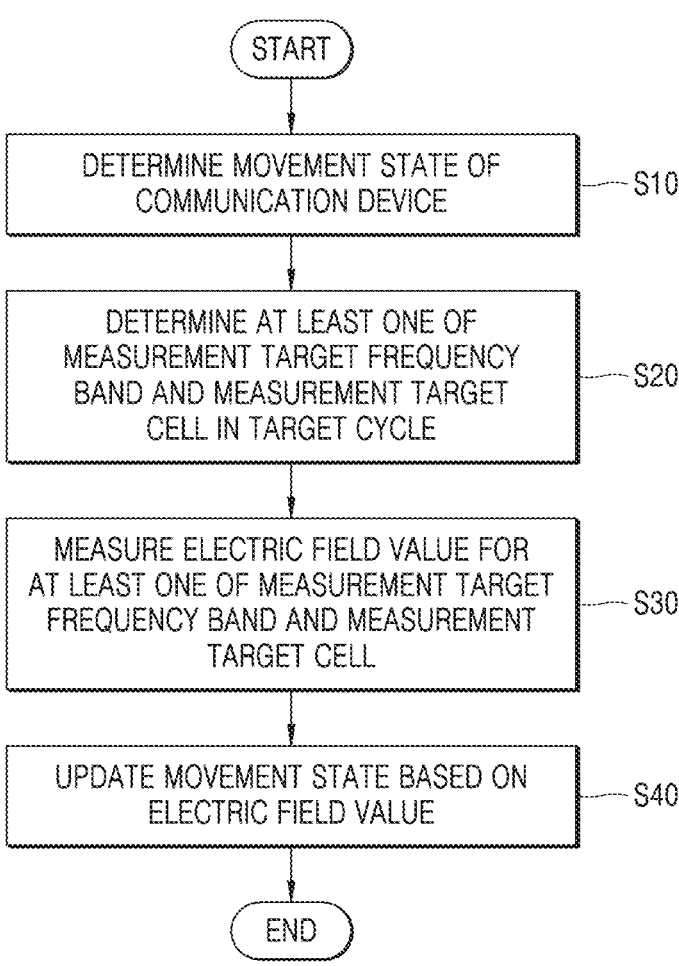
FIG. 4 is a flowchart illustrating a method of operating a communication device according to embodiments.

FIG. 4 is a flowchart illustrating a method of operating the communication device 10 according to embodiments.

Referring to FIG. 4, the communication device 10 may determine a movement state of the communication device 10 based on a measured electric field value, and may determine at least one of a measurement target frequency band MTF and/or the measurement target cell MTC according to the movement state. The communication device 10 may update the movement state of the communication device 10 by measuring an electric field value corresponding to the determined measurement target frequency band MTF and/or the measurement target cell MTC.

In operation S10, the communication device 10 may measure an electric field value of an inter-frequency band, and may determine the movement state of the communication device 10 based on the measured electric field value. The inter-frequency band may be a frequency band surrounding an intra-frequency band allocated to a serving cell. The movement state of the communication device 10 may be one of a normal state, a high-stationary state, and/or a full-stationary state, and the movement state may be determined according to an amount of change in the measured electric field value. According to embodiments, the movement state may further include a non-stationary state distinguished from the normal state.

According to embodiments, the communication device 10 may measure an electric field value in an inter-frequency band of a plurality of cells, and may determine the movement state of the communication device 10 based on the electric field value of the cell having the largest electric field value. In addition or in the alternative, the communication device 10 may determine the movement state differently depending on whether the power of an external device is turned on or off.

In operation S20, the communication device 10 may determine at least one of the measurement target frequency band MTF and/or the measurement target cell MTC to be measured in a target cycle according to the movement state. For example, when the movement state is a normal state, the communication device 10 may determine an intra-frequency band and an inter-frequency band as (e.g., to be) the measurement target frequency band MTF (e.g., the measurement target frequency band MTF may include the intra-frequency band and the inter-frequency band), and may set a period for measuring the intra-frequency band and a period for measuring the inter-frequency band to be different from each other. In addition, in the normal state, the communication device 10 may set inter RAT measurement to a period different from the period for measuring the intra-frequency band and the period for measuring the inter-frequency band.

In operation S30, the communication device 10 may measure an electric field value for the measurement target frequency band MTF and/or the measurement target cell MTC set in the target cycle. For example, when the movement state is a normal state, the communication device 10 may measure at least one electric field value according to whether the target cycle is a cycle for measuring an inter-frequency band, a cycle for measuring an intra-frequency band, or a cycle for performing inter RAT measurement.

In operation S40, the communication device 10 may update the movement state based on the measured electric field value. For example, when the communication device 10 determines that the movement state is a full-stationary state, the communication device 10 may update the movement state only with the electric field value for the serving cell (e.g., without measuring the electric field value of any cell other than the serving cell). Accordingly, when the communication device 10 determines that the movement state is a full-stationary state, because an electric field value measurement time may be reduced, compared to the normal state, the communication device 10 may enter a sleep mode faster than the normal state to reduce power consumption.

After completing the movement state update in the target cycle, the communication device 10 may enter the sleep mode, the communication device 10 may perform an electric field value measurement operation by determining the measurement target frequency band MTF and/or the measurement target cell MTC according to the updated movement state in a cycle following the sleep mode.

Figure 5:
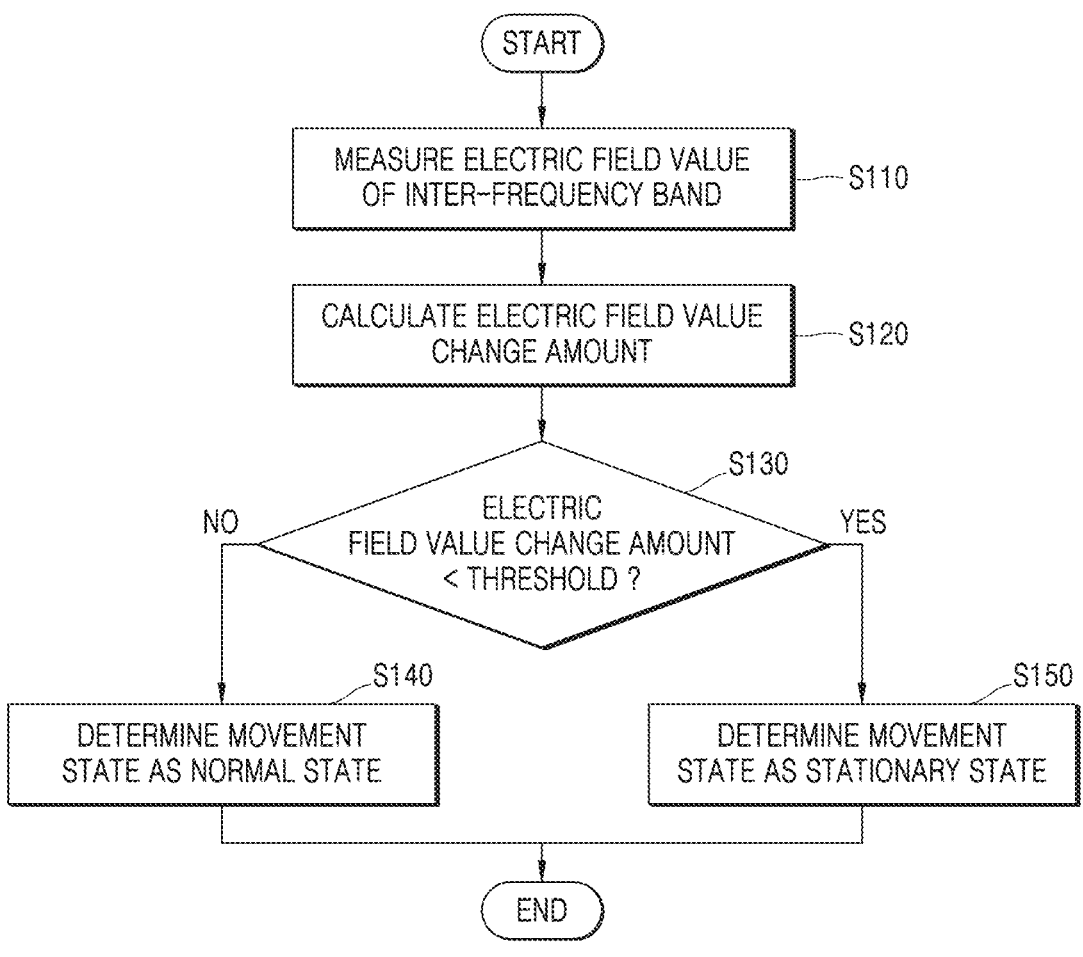
FIG. 5 is a flowchart illustrating a method of determining a movement state of a communication device according to embodiments.

FIG. 5 is a flowchart illustrating a method of determining a movement state of the communication device 10 according to embodiments.

Referring to FIG. 5, the communication device 10 may measure an electric field value of an inter-frequency band for a certain time, and may determine the movement state of the communication device 10 by calculating an electric field value change amount.

In operation S110, the communication device 10 may measure an electric field value of an inter-frequency band. The communication device 10 may store (e.g., in a memory) the electric field value of the inter-frequency band every time the electric field value of the inter-frequency band is measured, and may provide the electric field value of the inter-frequency band stored for a certain time to the movement state determination processor 121.

In operation S120, the communication device 10 may calculate the electric field value change amount for a certain time (e.g., over a certain time period). The electric field value change amount for a certain time may be, for example, a difference between the maximum (or highest) and minimum (or lowest) values of electric field values stored for a certain time (e.g., over a certain time period), but embodiments are not limited thereto, and the electric field value change amount for a certain time may mean an average change amount between a plurality of electric field values (e.g., over the certain time period).

According to embodiments, the communication device 10 may calculate the electric field value change amount for a plurality of time periods to determine a stationary state of the movement state for each operation. For example, the stationary state of the movement state may be divided into a high-stationary state and a full-stationary state that is determined to be maintained stationary for a longer period of time than the high-stationary state. The communication device 10 may calculate an electric field value change amount during a first time period to determine whether the movement state corresponds to the high-stationary state. The communication device 10 may calculate an electric field value change amount during a second time period that is longer than the first time period to determine whether the movement state corresponds to the full-stationary state.

In operation S130, the communication device 10 may compare the calculated electric field value change amount with a threshold. The threshold may be a reference value for determining whether the communication device 10 is in a stationary state.

In operation S150, when the electric field value change amount is less than the threshold, a distance change between the communication device 10 and a plurality of cells including the serving cell is small, and thus, the communication device 10 may determine the movement state as a stationary state. In this case, the communication device 10 may determine the stationary state as one of a high-stationary state and a full-stationary state according to a time interval of a certain time in which the electric field value change amount is calculated.

On the other hand, in operation S140, when the electric field value change amount is greater than or equal to the threshold, a distance change between the communication device 10 and a plurality of cells including the serving cell is large, and thus, the communication device 10 may determine the movement state as a normal state or a non-stationary state.

When the movement state is determined according to the electric field value change amount in the inter-frequency band, the communication device 10 may end the movement state determination operation, and determine at least one of the measurement target cell MTC and/or the measurement target frequency band MTF. In this case, when a movement state of a target cycle is changed from a movement state of the previous cycle, the communication device 10 may adjust at least one of the measurement target cell MTC and/or the measurement target frequency band MTF, and may maintain the measurement target cell MTC and/or the measurement target frequency band MTF when the movement state is not changed.

Figure 6:
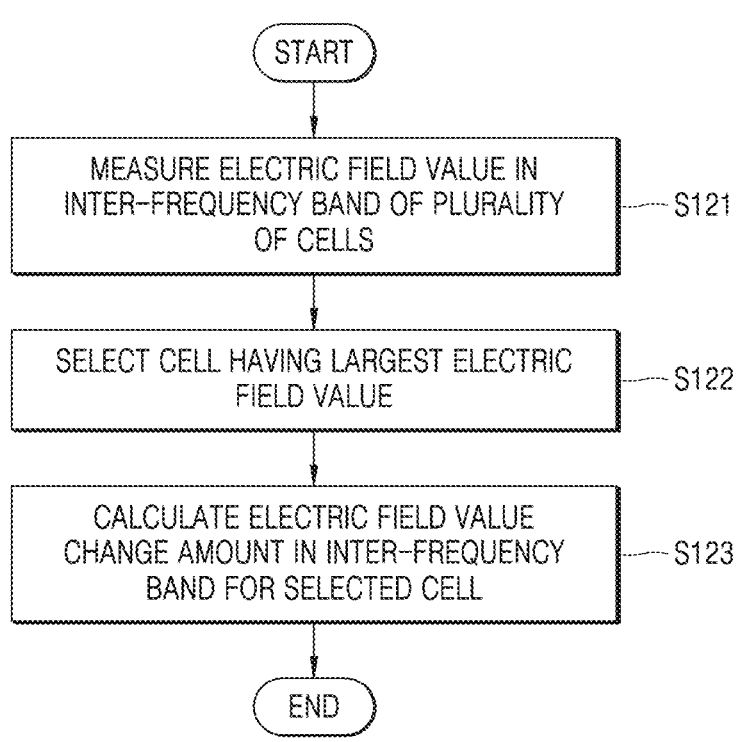
FIG. 6 is a flowchart illustrating a method of calculating an electric field value change amount in an inter-frequency band according to embodiments.

FIG. 6 is a flowchart illustrating a method of calculating an electric field value change amount in an inter-frequency band according to embodiments.

Referring to FIG. 6, in operation S120, the communication device 10 may determine a cell in which an electric field value change amount is to be calculated from among a plurality of cells.

In operation S121, the communication device 10 may measure electric field values in an inter-frequency band of the plurality of cells. According to embodiments, the communication device 10 may measure and store an electric field value of each of the plurality of cells, and may store an electric field value measured in the inter-frequency band and an electric field value measured in an intra-frequency band separately.

In operation S122, the communication device 10 may select a cell having the largest electric field value from among electric field values measured in the inter-frequency band.

In operation S123, the communication device 10 may calculate an electric field value change amount in the inter-frequency band for the selected cell. Accordingly, the communication device 10 may determine a movement state based on an electric field value measured from a cell in which a change amount is most reflected (e.g., most clearly indicated) from among the electric field values in the inter-frequency band.

Figure 7:
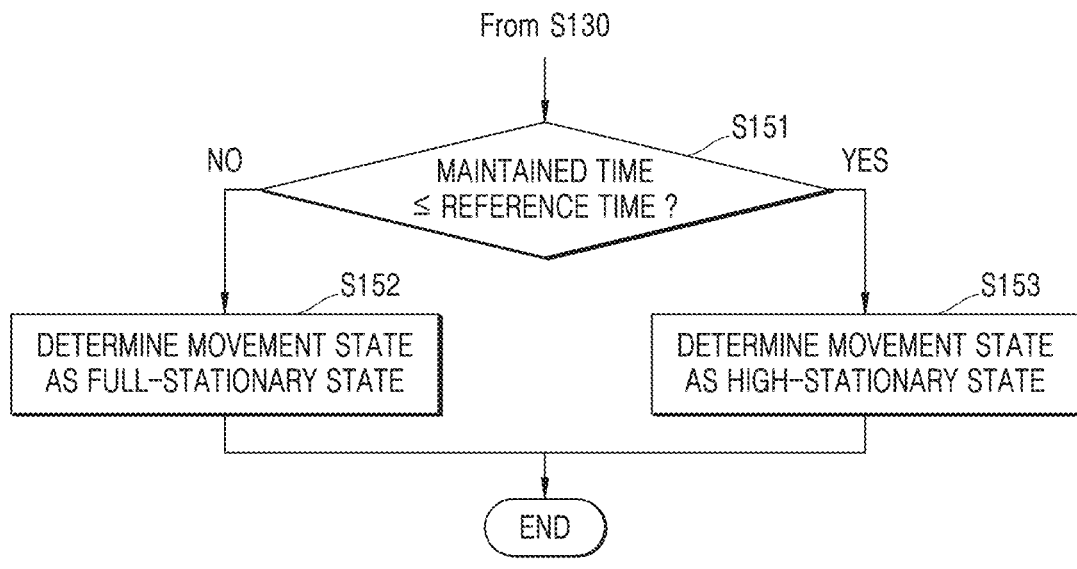
FIG. 7 is a flowchart illustrating a method of determining a movement state as a full-stationary state or a high-stationary state according to embodiments.

FIG. 7 is a flowchart illustrating a method of determining a movement state as a full-stationary state or a high-stationary state according to embodiments.

Referring to FIG. 7, when it is determined that the movement state is a stationary state, the communication device 10 may determine one of a full-stationary state and/or a high-stationary state according to a time (e.g., a period of time) during which an electric field value change amount is maintained below a threshold.

In operation S130, when an electric field value change amount measured for a certain time (e.g., certain time period) is less than the threshold, the communication device 10 may proceed to operation S151. In this case, the certain time may be set as a first time (e.g., first time period).

In operation S151, the communication device 10 may determine whether the amount of time the electric field value change amount is maintained below the threshold is less than or equal to a reference time. In this case, the reference time may be set as a second time, and may be a longer time period than the first time.

In operation S152, when it is determined that the maintained time exceeds the reference time, the communication device 10 may determine the movement state as a full-stationary state. That is, the communication device 10 may determine the movement state as a full-stationary state when the electric field value change amount is maintained less than the threshold for the second time or more.

In operation S153, when it is determined that the maintained time is equal to or less than the reference time, the communication device 10 may determine the movement state as a high-stationary state. That is, the communication device 10 may determine the movement state as a high-stationary state when the electric field value change amount is maintained below the threshold for the first time or more, and less than the second time.

When the movement state is determined to be one of the full-stationary state and/or the high-stationary state, the communication device 10 may end the movement state determination operation and determine the measurement target cell MTC or the measurement target frequency band MTF.

Figure 8:
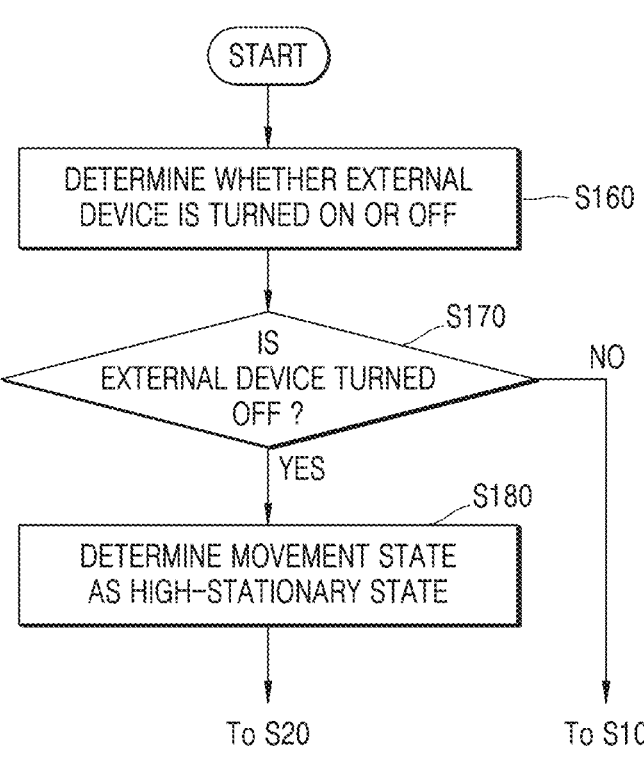
FIG. 8 is a flowchart illustrating a method of determining a movement state as a high-stationary state according to whether an external device for a communication device is turned on or off according to embodiments.

FIG. 8 is a flowchart illustrating a method of determining a movement state as a high-stationary state according to whether an external device for the communication device 10 is turned on or off according to embodiments.

Referring to FIG. 8, the communication device 10 may determine whether the power of the external device is turned off together with an electric field value change amount, and when the external device is turned off, may determine the movement state as a high-stationary state. The external device may be, for example, a vehicle. The communication device 10 may be connected to a vehicle or a wearable device to provide, to the vehicle, information useful to the vehicle by performing wireless communication. The external device is not limited to a vehicle (e.g., automobile), and may refer to any device that receives information through the communication device 10 while staying at a certain location when the external device is turned off.

In operation S160, the communication device 10 may determine whether the external device is turned on or off. According to embodiments, the application processor 200 of the communication device 10 may be connected to the external device, and when it is determined that there is no transmission and/or reception of information from the external device for a certain time or more, the application processor 200 may determine that the external device is turned off. However, the application processor 200 is not limited thereto and may directly receive the power state PW_ST from the external device.

In operation S170, when it is determined that the external device is turned off, the communication device 10 may proceed to operation S180, and when it is determined that the external device is turned on, the communication device 10 may proceed to operation S10. When it is determined that the external device is turned on, the communication device 10 may determine the movement state based on the electric field value change amount.

In operation S180, when it is determined that the external device is turned off, the communication device 10 may determine the movement state as a high-stationary state. After the movement state is determined to be the high-stationary state, the communication device 10 may perform a discontinuous reception operation with a schedule set to the high-stationary state.

According to embodiments, when the external device is turned off and the movement state is determined to be a stationary state, and the electric field value change amount is maintained below the threshold in the high-stationary state for a certain period of time, the communication device 10 may determine the movement state to be a full-stationary state. In this case, the certain period of time during which the electric field value change amount is maintained below the threshold for the communication device 10 to change the movement state from the high-stationary state to the full-stationary state may be less than the reference time of FIG. 7.

For example, referring to FIG. 7, when the electric field value change amount is maintained to be less than the threshold for more than the time obtained by subtracting a first time from the second time, the communication device 10 may change the movement state from the high-stationary state to the full-stationary state. Accordingly, when the external device is turned off, the communication device 10 may more quickly determine whether the movement state is a full-stationary state, and may effectively reduce power consumed when performing the discontinuous reception operation.

Figure 9:
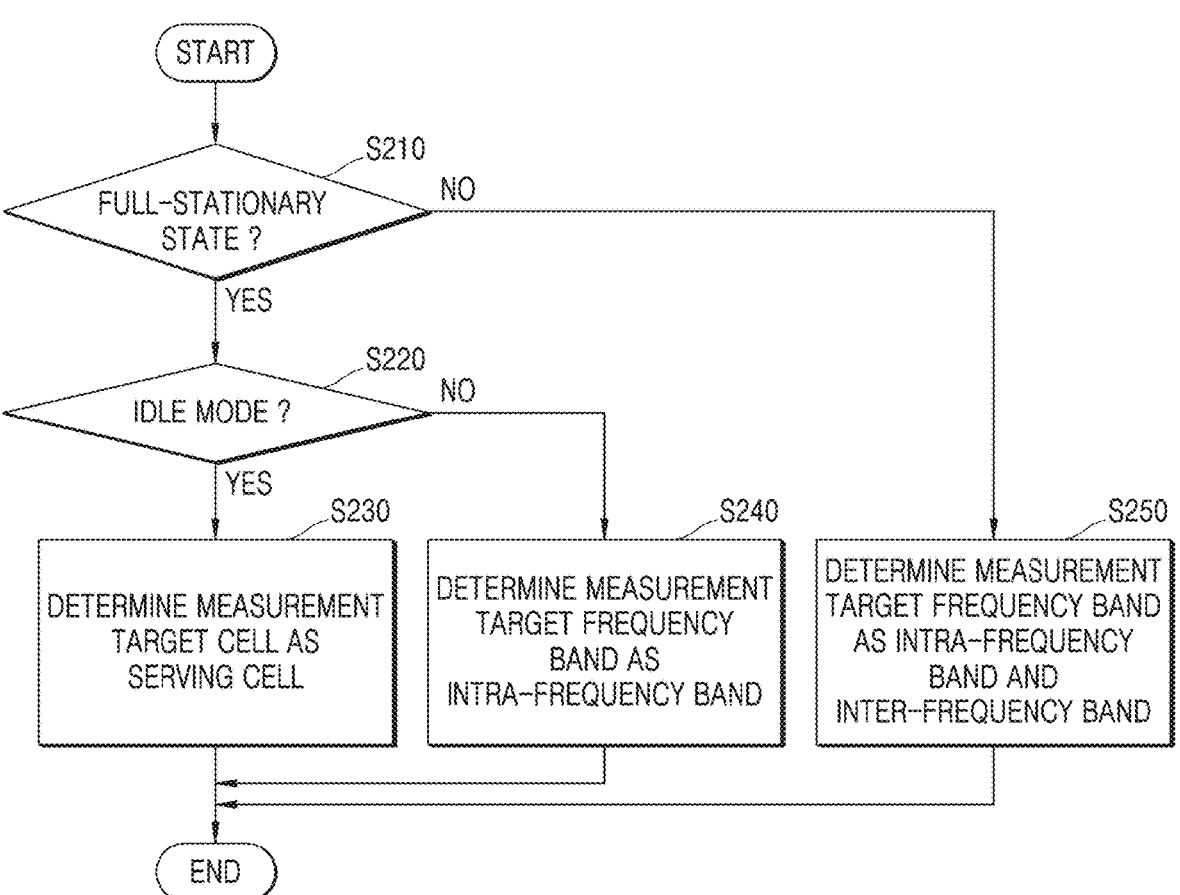
FIG. 9 is a flowchart illustrating a method of determining a measurement target cell or a measurement target frequency band based on a discontinuous reception operation mode according to embodiments.

FIG. 9 is a flowchart illustrating a method of determining the measurement target cell MTC or the measurement target frequency band MTF based on a discontinuous reception operation mode according to embodiments.

Referring to FIG. 9, the communication device 10 may determine at least one of the measurement target cell MTC and/or the measurement target frequency band MTF according to the discontinuous reception mode when it is determined that a movement state is a complete (e.g., full) stationary state.

In operation S210, the communication device 10 may determine whether the movement state is a full-stationary state. When it is determined that the movement state is a non-stationary state, a normal state, or a high-stationary state, the communication device 10 may proceed to operation S250, and when it is determined that the movement state is a full-stationary state, the communication device 10 may proceed to operation S220.

In operation S220, the communication device 10 may determine whether the discontinuous reception mode in a target cycle is an idle mode. The discontinuous reception mode may one of an idle mode and/or a connected mode. The idle mode may be a mode in which the communication device 10 is not connected to a base station and waits for communication connection from the base station, and the connected mode may be a mode in which the communication device 10 is connected to the base station and determines whether a downlink packet is received from the base station.

In operation S230, when the communication device 10 is in a full-stationary state and the discontinuous reception mode is the idle mode, the communication device 10 may determine the measurement target cell MTC as (e.g., to be) the serving cell, and may schedule so as not to measure electric field values for cells other than the serving cell (e.g., measuring the electric field values of the serving cell without measuring the electric field values for any cell other than the serving cell). According to embodiments, in operation S230, the communication device 10 may skip the measurement of electric field values of any cell other than the serving cell while maintaining a network connection with the serving cell and performing DRX.

In operation S240, when the communication device 10 is in a full-stationary state and the discontinuous reception mode is the connected mode, the communication device 10 may determine the measurement target frequency band MTF as an intra-frequency band and schedule so as not to measure an electric field value in an inter-frequency band (e.g., measuring the electric field values of the intra-frequency band without measuring the electric field values for any other frequency band, such as the inter-frequency band). According to embodiments, in operation S240, the communication device 10 may skip the measurement of electric field values of any frequency band (e.g., an inter-frequency band) other than the intra-frequency band while maintaining a network connection with the serving cell and performing DRX.

In operation S250, the communication device 10 may determine the measurement target frequency band MTF as (e.g., as including) the intra-frequency band and the inter-frequency band when it is determined that the movement state is not a full-stationary state. In addition, the communication device 10 may periodically measure an electric field value for inter RAT.

According to embodiments, when it is determined that the movement state is a non-stationary state or a normal state, the communication device 10 may set a period for measuring the intra-frequency band and a period for measuring the inter-frequency band differently from each other (e.g., the measurement periods may not overlap). The period for measuring the intra-frequency band may be shorter than the period for measuring the inter-frequency band. For example, the communication device 10 may measure an electric field value in the intra-frequency band every cycle, and may measure an electric field value of the inter-frequency band every 2 cycles. That is, the communication device 10 may measure an electric field value of the intra-frequency band more frequently than an electric field value of the inter-frequency band. According to embodiments, when it is determined that the movement state is a non-stationary state or a normal state, the communication device 10 may measure the intra-frequency band and the inter-frequency band with respect to the serving cell and/or one or more neighboring cells (e.g., base stations).

When it is determined that the movement state is a high stationary state, the communication device 10 may measure an electric field value every period longer (e.g., with a longer period between successive measurements) than an electric field value measurement period of a non-stationary state or a normal state. For example, in the normal state, the communication device 10 may measure an electric field value of the intra-frequency band every cycle and measure an electric field value of the inter-frequency band every 2 cycles, and in a high-stationary state, may measure an electric field value of the intra-frequency band every 2 cycles and measure an electric field value of the inter-frequency band every 4 cycles.

Figure 10:
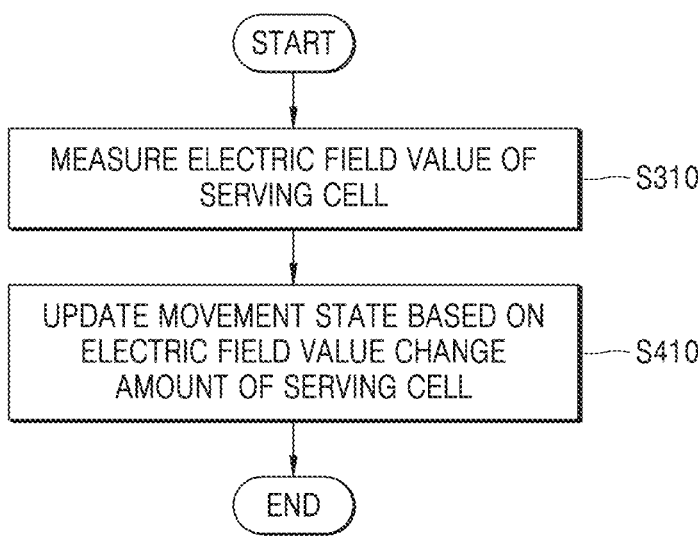
FIG. 10 is a flowchart illustrating a method of updating a movement state in an idle mode according to embodiments.

FIG. 10 is a flowchart illustrating a method of updating a movement state in an idle mode according to embodiments.

Referring to FIG. 10, when the measurement target cell MTC is determined as (e.g., to be) a serving cell, the communication device 10 may measure an electric field value of the serving cell, and at this time, update a movement state based on the amount of change in the measured electric field value.

In operation S310, the communication device 10 may measure the electric field value of the serving cell. The idle mode is a mode in which the communication device 10 is not performing communication, but is connected to a network and waiting to perform communication, and may be a mode in which to check whether cell reselection should be performed while reducing power consumption. Accordingly, the communication device 10 may measure only an electric field value of the serving cell without measuring an electric field value of the neighboring cell.

In operation S410, the communication device 10 may update the movement state based on the electric field value change amount of the serving cell. According to embodiments, when the electric field value change amount of the serving cell measured for a certain time is maintained to be less than a threshold, the communication device 10 may maintain the movement state as a full-stationary state. In contrast, when the electric field value change amount for a certain time is equal to or greater than the threshold due to the newly measured electric field value of the serving cell, the communication device 10 may change the movement state to a high-stationary state, a normal state, or a non-stationary state.

The communication device 10 that has updated the movement state based on the electric field value change amount of the serving cell may measure an electric field value according to the updated movement state in a subsequent discontinuous reception operation. For example, the communication device 10 may reduce power consumption by measuring only an electric field value of the serving cell in a subsequent discontinuous reception operation when the movement state is maintained in a full-stationary state. In contrast, when the movement state is changed to a high-stationary state, a normal state, or a non-stationary state, the communication device 10 may more accurately determine the movement state of the communication device 10 by measuring not only an electric field value of the serving cell but also other electric field values (e.g., electric field values of other cells).

Figure 11:
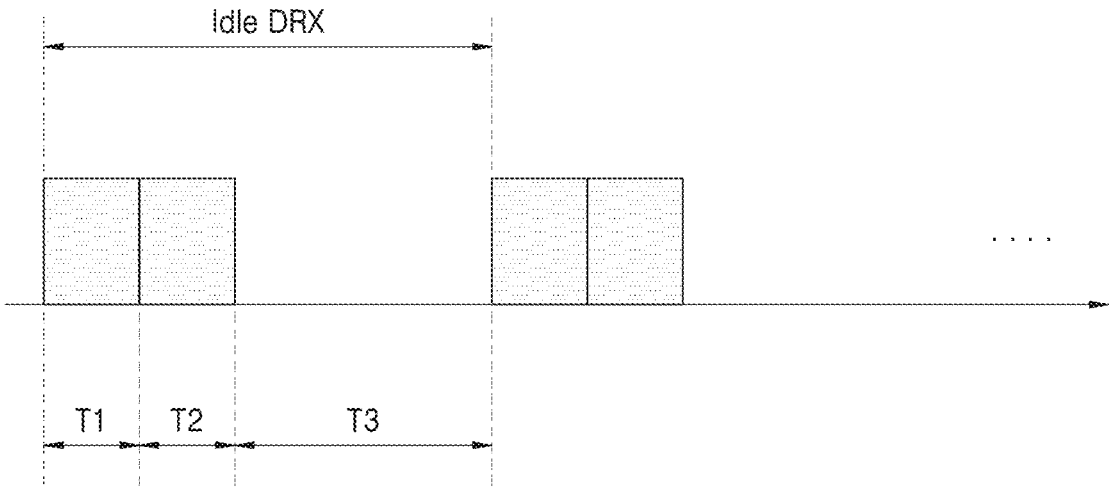
FIG. 11 is a view illustrating a discontinuous reception operation performed in an idle mode according to embodiments.

FIG. 11 is a view illustrating a discontinuous reception operation performed in an idle mode according to embodiments.

Referring to FIG. 11, the communication device 10 may measure an electric field value and receive paging in an idle mode, and may enter a sleep mode. At this time, the communication device 10 may adaptively schedule a time for measuring an electric field value by varying the measurement target cell MTC to measure an electric field value and a measurement target frequency according to a movement state.

The discontinuous reception operation may include a wakeup period in which electric field value measurement and paging reception are performed, and a sleep period in which power and a clock (e.g., a clock signal) are cut off to reduce power consumption. The communication device 10 may adjust lengths of the wakeup period and the sleep period during a discontinuous reception cycle by adjusting an electric field value measurement time according to the movement state.

Referring to FIG. 11, a discontinuous reception cycle of one idle mode may include a first time period T1 to (e.g., through) a third time period T3. The communication device 10 may maintain a wake-up state during the first time period T1 and the second time period T2, and may enter a sleep mode in the third time period T3.

The communication device 10 may measure an electric field value according to the movement state of the communication device 10 in the first time period T1. For example, when it is determined that the movement state is a full-stationary state, the communication device 10 may measure only an electric field value for a serving cell.

The communication device 10 may receive paging in the second time period T2 after measuring the electric field value. The paging is information indicating whether there is a call or data to be received by the communication devices 10, and the communication device 10 may check whether an identifier thereof is included in the received paging. At this time, if there is paging corresponding to the communication device 10 within the received paging, the communication device 10 may communicate with a base station that has transmitted the paging without entering a sleep mode.

In contrast, when the communication device 10 receives paging that does not correspond to itself, the communication device 10 may enter a sleep mode in the third time period T3. The sleep mode is a state in which power supply or a clock of the communication device 10 is cut off, and the communication device 10 may not consume power in the third time period T3.

According to embodiments, when the movement state is a full-stationary state, the communication device 10 may reduce power consumption by shortening a length of the first time period T1 for measuring an electric field value. According to embodiments, when the first time period T1 is shortened (e.g., set to be shorter), the third time period T3 associated with the sleep mode is lengthened (e.g., set to be longer) by a corresponding amount. When the movement state is a normal state or a non-stationary state, the communication device 10 may increase performance by also measuring an electric field value of an inter-frequency band. According to embodiments, in the sleep mode, power may be removed (e.g., cut or reduced) one or more components (e.g., a radio frequency transmission and/or reception chain(s)) of the communication device 10 to conserve power.

Figure 12:
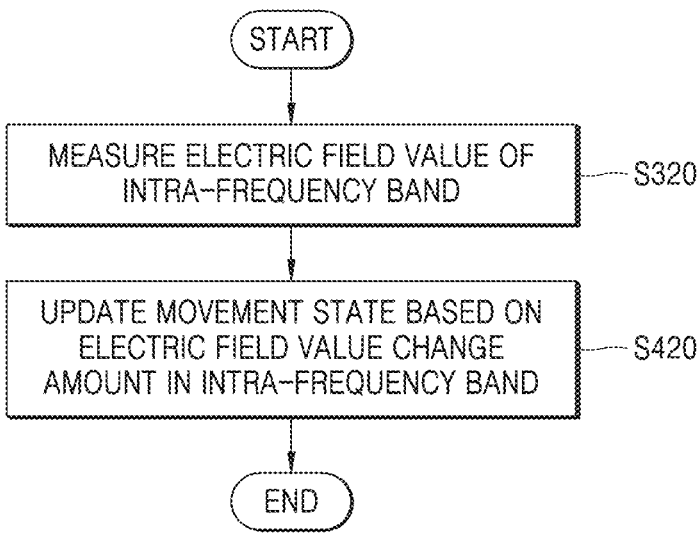
FIG. 12 is a flowchart illustrating a method of updating a movement state in a connected mode according to embodiments.

FIG. 12 is a flowchart illustrating a method of updating a movement state in a connected mode according to embodiments.

Referring to FIG. 12, when a discontinuous reception mode is a connected mode and the measurement target frequency band MTF is determined as an intra-frequency band, the communication device 10 may measure an electric field value of the intra-frequency band, and at this time, update the movement state based on the amount of change in the measured electric field value.

In operation S320, the communication device 10 may measure an electric field value of the intra-frequency band. The connected mode may be a mode in which the communication device 10 is wirelessly connected (e.g., radio resource control (RRC) connected) to a base station and waits for a downlink packet. In this case, the communication device 10 may measure only an electric field value of the intra-frequency band without measuring an electric field value of the inter-frequency band.

In operation S420, the communication device 10 may update the movement state based on the electric field value change amount in the intra-frequency band. According to embodiments, when the electric field value change amount in the intra-frequency band measured for a certain time is maintained to be (e.g., at a value) less than a threshold, the communication device 10 may maintain the movement state as a full-stationary state. In contrast, when the electric field value change amount for a certain time is equal to or greater than the threshold due to the newly measured electric field value of the intra-frequency band, the communication device 10 may change the movement state to a high-stationary state, a normal state, or a non-stationary state.

Figure 13:
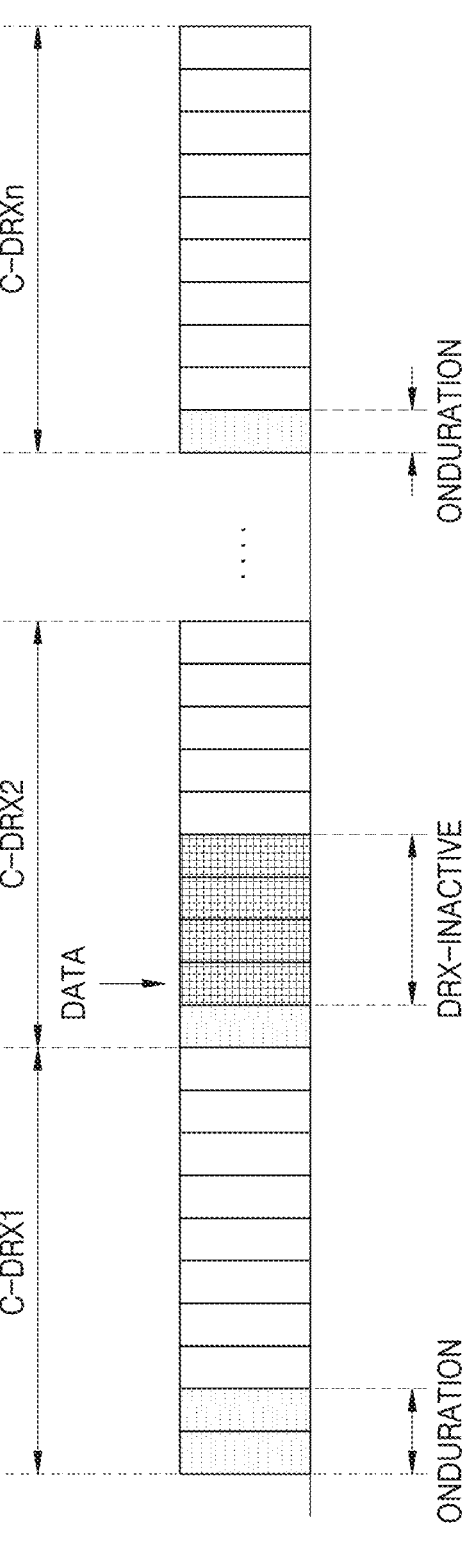
FIG. 13 is a view illustrating a discontinuous reception operation performed in a connected mode according to embodiments.

FIG. 13 is a view illustrating a discontinuous reception operation performed in a connected mode according to embodiments.

Referring to FIG. 13, when the communication device 10 is connected to a base station, a discontinuous reception operation may be performed in a connected mode. The communication device 10 may receive scheduling information from the base station, and a discontinuous reception inactivity timer (DRX inactivity timer) may be started according to the scheduling information.

When the discontinuous reception inactivity timer expires, the communication device 10 may perform a discontinuous reception operation, and may wake up with a discontinuous reception cycle period and monitor a Physical Downlink Control CHannel (PDCCH) for an onduration period (ONDURATION). For example, one discontinuous reception cycle may consist of 10 subframes, and when the discontinuous reception inactivity timer expires in a first discontinuous reception cycle C-DRX1, the communication device 10 may wake up during the ONDURATION consisting of two subframes to monitor the PDCCH. After the ONDURATION, the communication device 10 may enter a sleep mode to cut off power and a clock to reduce power consumption.

When the discontinuous reception inactivity timer expires and the discontinuous reception operation is performed in the connected mode, a period for performing the discontinuous reception operation may be set differently according to a cycle period of long discontinuous reception (LongDRX) and a cycle period of short discontinuous reception (ShortDRX) that are preset or alternatively, given. Hereinafter, embodiments in which an electric field value is measured at the same period (or similar periods) will be described, but in embodiments, a period for measuring an electric field value is not limited thereto.

In a second discontinuous reception cycle C-DRX2, when the communication device 10 receives data (DATA) of a downlink packet from a base station during the ONDURATION, a discontinuous reception inactivity timer may be started. The communication device 10 may receive data during the discontinuous reception inactive period (DRX-INACTIVE) and extend PDCCH monitoring.

According to embodiments, the communication device 10 may measure an electric field value during the ONDURATION, and may determine the movement state based on an electric field value change amount. In a discontinuous reception mode of the connected mode, the communication device 10 may measure an electric field value in an intra-frequency band when it is determined that the movement state is a full-stationary state. Accordingly, the communication device 10 may adaptively set a length of the ONDURATION for performing a discontinuous reception operation, and for example, may allocate a time period corresponding to one subframe in an $n^{th}$ discontinuous reception cycle C-DRXn as the ONDURATION.

Figure 14:
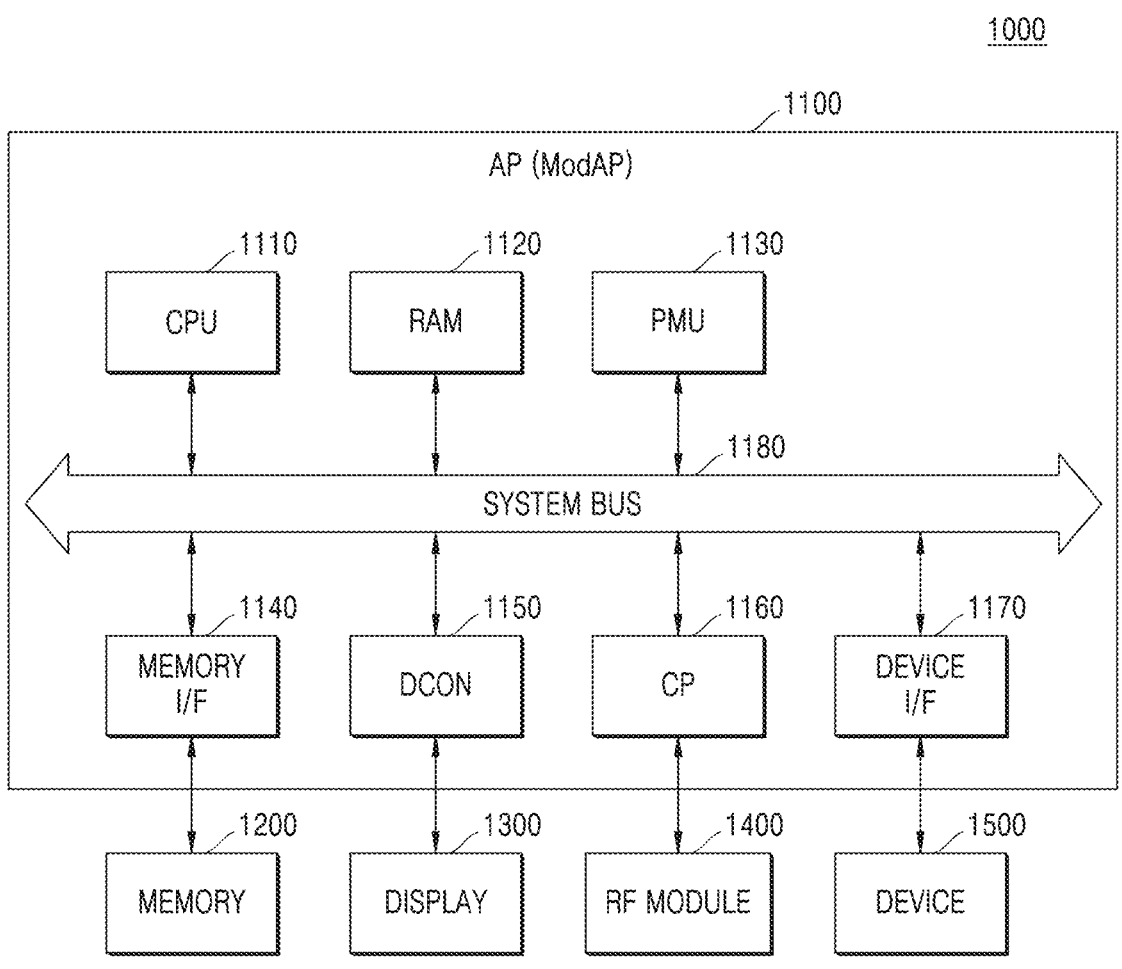
FIG. 14 is a block diagram of an application processor including a communication processor according to embodiments.

FIG. 14 is a block diagram of an application processor including a communication processor according to embodiments.

Referring to FIG. 14, a system 1000 may include an application processor (hereinafter referred to as an AP) 1100, a memory 1200, a display 1300, an RF module 1400, and/or a device (e.g., an external device) 1500. In addition, the system 1000 may further include various components such as a lens, a sensor, and/or an audio module.

The AP 1100 may be implemented as a system on chip (SoC), and may include a central processing unit (CPU) 1110, random access memory (RAM) 1120, a power management unit (PMU) 1130, a memory interface (I/F) 1140, a display controller (DCON) 1150, a communication processor (CP) 1160, a device interface (I/F) 1170, and/or a system BUS 1180. The AP 1100 may further include various intellectual properties (IPs) blocks. The AP 1100 may be referred to as a ModAP as functions of a communication processor chip are integrated therein.

The CPU 1110 may control overall operations of the AP 1100 and the system 1000. The CPU 1110 may control the operation of each component of the AP 1100. In addition, the CPU 1110 may be implemented as a multi-core. The multi-core is one computing component with two or more independent cores.

The RAM 1120 may temporarily store programs, data, or instructions. For example, programs and/or data stored in the memory 1200 may be temporarily stored in the RAM 1120 according to the control of the CPU 1110 or booting code. The RAM 1120 may be implemented as dynamic random access memory (DRAM) or static RAM (SRAM).

The PMU 1130 may manage power (e.g., power levels) of (e.g., provided to) each component of the AP 1100. The PMU 1130 may also determine an operation state of each component of the AP 1100 and control the operation of the component.

The memory I/F 1140 may control all operations of the memory 1200 and may control data exchange between each component of the AP 1100 and the memory 1200. The memory I/F 1140 may write or read data to or from the memory 1200 according to the request of the CPU 1110.

The DCON 1150 may transmit, to the display 1300, image data to be displayed on the display 1300. The display 1300 may be implemented as a flat panel display such as a liquid crystal display (LCD), an organic light emitting diode (OLED) display, or a flexible display.

For wireless communication, the communication processor 1160 may modulate data to be transmitted appropriately for a wireless environment and recover received data. The communication processor 1160 may perform digital communication with an RF module 1400.

For reference, the communication processor 100 described above with reference to FIG. 1 may be implemented in the communication processor 1160. The communication processor 1160 may determine a movement state based on an electric field value change amount measured by the RF module 1400 for a certain time, and may determine a measurement schedule of the electric field value according to the movement state.

The RF module 1400 may convert a high frequency signal received through an antenna into a low frequency signal and transmit the low frequency signal to the communication processor 1160. In addition, the RF module 1400 may convert a low-frequency signal received from the communication processor 1160 into a high-frequency signal, and transmit the high-frequency signal to the outside of the system 1000 through an antenna. In addition, the RF module 1400 may amplify or filter a signal.

The external device 1500 may be a vehicle as an example, and the AP 1100 may receive information about a power state of the external device 1500 through the device I/F 1170. In addition, the device I/F 1170 may receive information from the external device 1500 and may provide information requested by the external device 1500 to the external device 1500.

Conventional wireless devices measure electric field values for serving cell selection according to a discontinuous reception (DRX) operation cycle. The conventional wireless devices continuously perform such electric field value measurements when the conventional wireless devices are in a stationary state and cell reselection is unlikely. Accordingly, the conventional wireless devices perform excessive electric field value measurements resulting in excessive power consumption.

However, according to embodiments, improved wireless devices are provided. For example, the improved wireless devices may determine a movement state and reduce the electric field measurements when the movement state is stationary (e.g., full-stationary). The improved wireless devices may reduce the electric field measurements by limiting the measurements to those of a serving cell (rather than a plurality of cells) and/or an intra-frequency band (rather than the intra-frequency band and the inter-frequency band). The reduction in electric field measurements enables the improved wireless devices to decrease a duration of an electric field measurement period in a DRX cycle and make a proportional increase to a duration of a sleep mode in the DRX cycle. During the sleep mode, power consumption of the improved wireless devices is reduced. Accordingly, the improved wireless devices improve over the deficiencies of the conventional wireless devices to at least reduce power consumption.

According to embodiments, operations described herein as being performed by the communication device 10, the communication processor 100, the application processor 200, the measurement module 300, the power interface 110, the control module 120, the movement state determination processor 121, the cell management controller 122, the measurement controller 123, the measurement scheduler 124, the DRX controller 125, the first base station 21, the second base station 22, the third base station 23, the system 1000, the AP 1100, the RF module 1400, the external device 1500, the CPU 1110, the PMU 1130, the memory interface (I/F) 1140, the display controller (DCON) 1150, the communication processor 1160 and/or the device interface (I/F) 1170 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium (e.g., the memory 1200, the RAM 1120, etc.). A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concepts have been particularly shown and described with reference to embodiments thereof, it will be understood that various changes in form and details may be made therein without departing from the spirit and scope of the following claims.

What is claimed is:

1. A method of operating a communication device supporting a discontinuous reception (DRX) operation, the method comprising:

first determining a movement state of the communication device based on a first electric field value change amount in an inter-frequency band to obtain a determined movement state, the inter-frequency band being different from an intra-frequency band allocated for communication with a serving cell, and the inter-frequency band being allocated for communication with a neighbor cell different from the serving cell; and performing first operations, second operations or third operations, the first operations including, second determining a measurement target cell to be the serving cell based on the determined movement state being a full-stationary state and the discontinuous reception operation being performed in an idle mode, measuring an electric field value corresponding to the measurement target cell based on the second determining, and updating the movement state based on a second electric field value change amount measured for the serving cell to obtain a first updated movement state, the second operations including, third determining a measurement target frequency band to be the intra-frequency band based on the determined movement state being the full-stationary state and the discontinuous reception operation being performed in a connected mode, measuring an electric field value corresponding to the measurement target frequency band based on the third determining, and updating the movement state based on a third electric field value change amount measured for the intra-frequency band to obtain a second updated movement state, and the third operations including, fourth determining a measurement target frequency band to be the intra-frequency band and the inter-frequency band based on the determined movement state not being the full-stationary state, measuring an electric field value corresponding to the measurement target frequency band based on the fourth determining, and updating the movement state based on a fourth electric field value change amount measured for the intra-frequency band and the inter-frequency band to obtain a third updated movement state.

2. The method of claim 1, wherein the first determining comprises:

determining the movement state to be a stationary state based on the first electric field value change amount being less than a threshold for a time period.

3. The method of claim 1, wherein the first determining comprises:

measuring a plurality of electric field values in the inter-frequency band of a plurality of cells, the plurality of cells including the serving cell; and calculating the first electric field value change amount for a cell among the plurality of cells having a greatest electric field value from among the plurality of electric field values.

4. The method of claim 1, wherein the performing includes performing the first operations to obtain the first updated movement state.

5. The method of claim 4, further comprising:

receiving paging after the updating of the movement state; and entering into a sleep mode when the paging does not correspond to the communication device.

6. The method of claim 1, wherein the performing includes performing the second operations to obtain the second updated movement state.

7. The method of claim 6, further comprising:

performing the updating of the movement state and entering a sleep mode based on the second updated movement state being the full-stationary state and a downlink packet not being received from a base station.

8. The method of claim 1, wherein the first determining comprises determining the movement state according to whether power of a device connected to the communication device is turned off.

9. The method of claim 8, wherein the first determining comprises determining the movement state to be a high-stationary state based on the power of the device being turned off; and the performing includes performing the third operations to obtain the third updated movement state.

10. The method of claim 9, further comprising:

increasing a period of a cycle for measuring the electric field value based on the determined movement state being the high-stationary state.

11. A communication device comprising:

processing circuitry configured to, first determine a movement state of the communication device based on a first electric field value change amount in an inter-frequency band to obtain a determined movement state, the inter-frequency band being different from an intra-frequency band allocated for communication with a serving cell, and the inter-frequency band being allocated for communication with a neighbor cell different from the serving cell, second determine at least one of a measurement target frequency band or a measurement target cell according to the determined movement state based on the first determination, the measurement target frequency band being one of the intra-frequency band or the inter-frequency band, measure an electric field value corresponding to the at least one of the measurement target frequency band or the measurement target cell, and update the movement state based on the electric field value to obtain an updated movement state, wherein the processing circuitry is configured to, second determine the measurement target cell to be the serving cell based on the determined movement state being a full-stationary state and a discontinuous reception operation being performed in an idle mode, and update the movement state based on a second electric field value change amount measured for the serving cell.

12. The communication device of claim 11, wherein the processing circuitry is configured to first determine the movement state to be a stationary state based on the first electric field value change amount being less than a threshold for a time period.

13. The communication device of claim 11, wherein the processing circuitry is configured to:

second determine the measurement target frequency band to be the intra-frequency band based on the determined movement state being the full-stationary state and the discontinuous reception operation being performed in a connected mode; and update the movement state based on a third electric field value change amount measured for the intra-frequency band.

14. The communication device of claim 11, wherein the processing circuitry is configured to:

first determine the movement state to be a high-stationary state based on power of an external device being turned off, the external device being connected to the communication device; and increase a period of a cycle for measuring the electric field value based on the determined movement state being the high-stationary state.

* * * * *